UNITED STATES PATENT OFFICE.

ALEXANDER I. COCKER, GEORGE W. COLLYER, AND CLARENCE HAINES, OF TARRYTOWN, NEW YORK.

ALLOY.

SPECIFICATION forming part of Letters Patent No. 480,233, dated August 2, 1892.

Application filed September 24, 1891. Serial No. 406,721. (No specimens.)

*To all whom it may concern:*

Be it known that we, ALEXANDER I. COCKER, GEORGE W. COLLYER, and CLARENCE HAINES, of Tarrytown, in the county of Westchester and State of New York, have invented a new and useful Composite Metal, of which the following is a full, clear, and exact description.

Our invention relates to the alloy of iron with tin, so as to produce a hard ductile composite metal; and it consists in the fusion together of said primary metals in suitable proportions to produce a binary metal having a different nature from either and the admixture therewith of a flux, whereby the homogeneous blending together of the tin and iron is perfectly effected and loss of the tin by oxidation prevented.

It has been found that the fusion together of cast-iron and block-tin in certain proportions will completely change the nature of the iron, rendering it hard, close in grain, very tough, and capable of withstanding a greater load strain than the best pure cast-iron.

Heretofore it has been difficult in practice to fuse together iron and tin with accuracy as to proportions of the two metals, owing to the different degrees of heat required to liquefy them and the liability of consuming the tin partly or entirely when mixed with the melted iron.

To overcome the tendency to oxidation of the tin and to cause a complete admixture of the primary metals mentioned, a composition of matter is employed as a flux, which is introduced along with the metals and protects the tin from burning, while it facilitates the alloying therewith of the iron.

Different proportions of iron and tin may be combined which will give binary metals of different degrees of hardness, an increase in the proportion of tin to the iron rendering the product tougher and finer in the grain.

The preferred proportion of metals and ingredients for the flux is given in the following formula, a reasonable variation therefrom being allowable to produce a metallic compound adapted to the service it is designed for:

Metals.

| | lbs. |
|---|---|
| Iron | 16 |
| Tin | 1 |

Flux.

| | parts. |
|---|---|
| Borax | 72 |
| Carbonate of iron | 25 |
| Sal-ammoniac | 2 |
| Salt | 1 |
| Total | 100 |

The flux is compounded separately and added in proper quantity to the melted tin, which is then stirred into the fused iron, the composite mixture being kept melted and thoroughly stirred until poured into a mold.

The proportion of metals given will produce a composition that is superior for the casting of journal-bearings or the filling between safe-walls, and as it is nearly as cheap as cast-iron will afford an excellent substitute for more costly material.

Having thus described our invention, what we claim as new, and desire to secure by Letters Patent, is—

The method of forming an alloy of iron and tin, consisting in mixing the same in substantially the proportions specified and fusing the metals in the presence of a flux composed of borax, carbonate of iron, sal-ammoniac, and salt.

ALEXANDER I. COCKER.
      GEO. W. COLLYER.
      CLARENCE HAINES.

Witnesses:
  HENRY C. GRIFFIN,
  FRED SYPHER.